April 28, 1964 W. F. S. CHITTLEBURGH ETAL 3,131,264

MULTI-FREQUENCY SIGNALLING RECEIVERS

Filed April 5, 1961

Inventor

W.F.S.Chittleburgh-
E.S.Simmonds

By [signature]
Attorney

United States Patent Office 3,131,264
Patented Apr. 28, 1964

3,131,264
MULTI-FREQUENCY SIGNALLING RECEIVERS
William Francis Sidney Chittleburgh and Ernest Sidney Simmonds, London, England, assignors to International Standard Electric Corporation, New York, N.Y.
Filed Apr. 5, 1961, Ser. No. 100,855
Claims priority, application Great Britain Apr. 13, 1960
3 Claims. (Cl. 179—84)

Figures 1, 2:
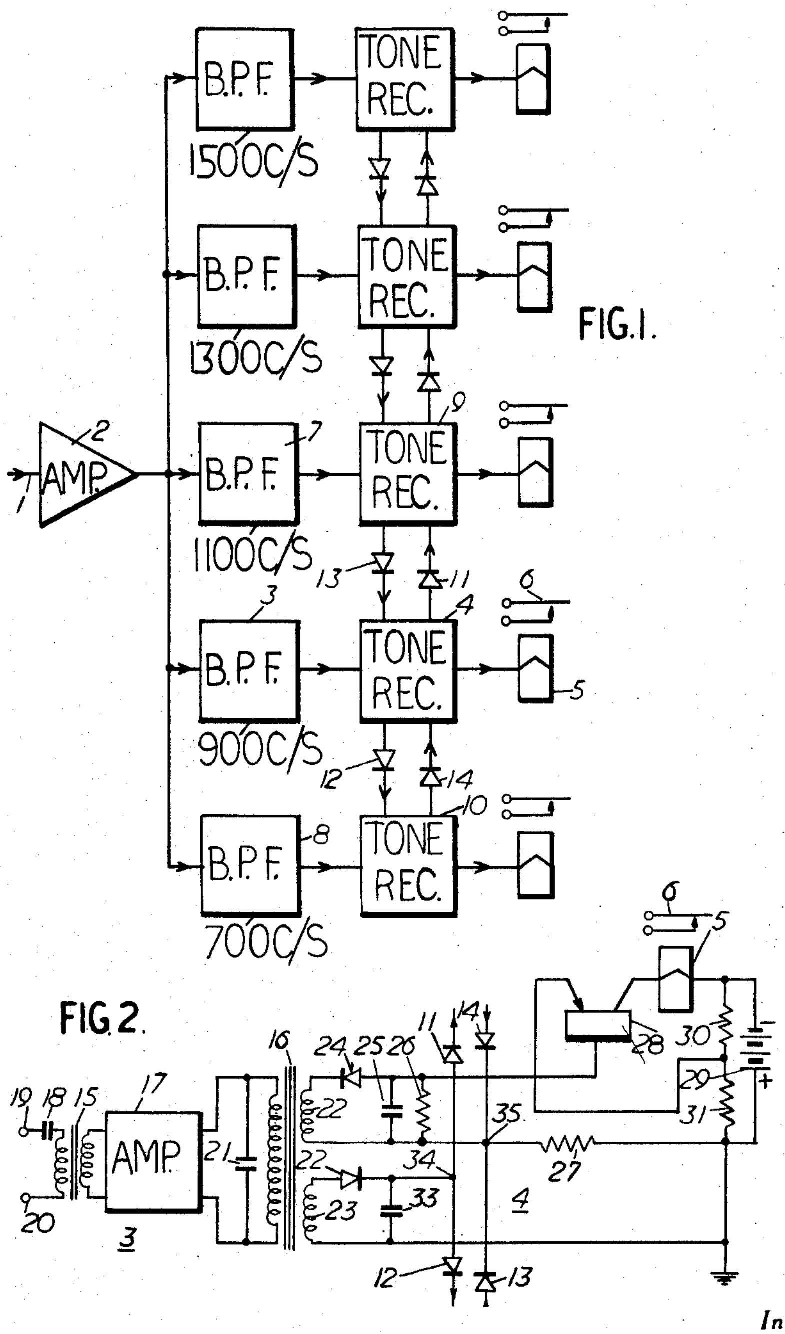

The present invention relates to signal receivers for voice frequency signalling systems in which two or more tones have to be selectively received.

The invention is principally concerned with systems in which signals, such as telephone dial signals, are converted into audio frequency tone signals for transmission over long or short telephone channels. In such systems, tones of several different frequencies are used, and the dial signals are represented by selecting for transmission certain of the tones, a different selection being used for each digit. For example, five different tones may be available and different pairs of the tones may be used to represent the respective dial digits. It is evident that other types of control or supervising or telegraph signals could be transmitted by tones in like manner.

In these systems it is necessary to identify separately the transmitted tones at the receiving end of the system and to reconvert them into the corresponding dial digits (or the like). This may be done by separating the tones by means of suitable filters and by applying the tones so separated to operate corresponding tone receivers.

Since it is often necessary for the frequencies of the tones to be rather close together and since there is likely to be a rather large variation in the level of the received tones, the separating filters may have to meet rather sharp cut-off requirements in order to ensure that false operation of the tone receivers will not occur as a result of insufficient attenuation in the stop bands of the filters, and the filters therefore tend to be expensive.

The object of the present invention is to provide a multi-frequency tone receiving arrangement in which relatively cheap filters can be used without the risk of false operation of the tone receivers due to the lack of sharpness of the cut-off of the filters.

This object is achieved according to the invention by providing a signal receiver for a voice-frequency signalling system in which at least some of the signals are each represented by two or more different tones selected from a plurality of tones of different audio frequencies arranged in order in a series, the selected tones being transmitted to the receiver, in which the receiver comprises a plurality of tone receiving circuits corresponding respectively to the plurality of tones, each tone receiving circuit including a filter adapted to select the tone of the corresponding frequency and a tone receiver adapted to respond to the selected tone, and means controlled in response to the receipt of a tone of a given frequency for reducing the sensitivity of the tone receiver adapted to respond to another tone having a frequency adjacent to the given frequency in the said series, the reduction in sensitivity being insufficient to prevent the last-mentioned tone receiver from responding to the corresponding tone, when present.

The invention will be described with reference to the accompanying drawings, in which:

FIG. 1 shows a block schematic circuit diagram of an embodiment of the invention; and FIG. 2 shows details of certain elements of FIG. 1.

In order to illustrate the invention it will be assumed that dial or other control or supervisory or telegraph signals are transmitted by selections of pairs of tones from five available tones of frequencies 700, 900, 1100, 1300 and 1500 cycles per second. It should be understood, however, that other frequencies may be used and that the number of tones available may be different from five; and, further, that each signal may be represented by more than two of the tones. Clearly, also, some of the signals may be represented by single tones, but it must be assumed that frequently two or more tones will be simultaneously transmitted, otherwise there would be no need for the invention.

Referring to FIG. 1, the tones are received from a conductor 1 which is connected through an amplifier 2 to five tone receiving circuits in parallel, all of which comprise similar elements. Thus the circuit corresponding to the 900 cycle tone comprises a bandpass filter 3 which is connected to a tone receiver 4 which controls a relay 5 having a set of contacts 6. The bandpass filter 3 is designed to select the 900 cycle tone and may include an amplifier (not shown). The five tone receiving circuits differ only in that the bandpass filters are tuned to select different ones of the five tones as indicated in FIG. 1.

If inexpensive filters are provided and when a 900 cycle tone is received alone, there may be an appreciable output from each of the filters 7, 8, corresponding to the adjacent tone frequencies 1100 and 700 cycles, so that there is a danger that the tone receivers 9 and 10 may be falsely operated. According to the invention, in order to remove this danger, the tone receiver 4 is designed to generate a bias potential which is supplied to the tone receivers 9 and 10 through the respective rectifiers 11 and 12, this bias potential having the effect of reducing the sensitivity of the tone receivers 9 and 10 sufficiently to prevent them from responding to the 900 cycle tone which leaks through the filters 7 and 8. The reduction in sensitivity should, however, not be so great that the tone receiver 9 or 10 is prevented from responding when the corresponding tone of frequency 1100 or 700 cycles is received simultaneously with the 900 cycle tone.

It will be understood that in like manner the tone receiver 9 generates a bias potential when the 1100 cycle tone is received, which bias potential is supplied through the rectifier 13 to desensitize the tone receiver 4; and the tone receiver 10 generates a similar bias potential when the 700 cycle tone is received, which is supplied through the rectifier 14 to desensitize the tone receiver 4. All the tone receivers corresponding to adjacent tone frequencies are interconnected in like manner by pairs of rectifiers as indicated, and it will be evident that the same arrangement may be extended in the same way to a receiver for any number of different tone signals.

When deciding upon the degree of desensitising of the tone receivers, the fact that the level of the received tone signals may in some cases vary over a relatively wide range, and also that there may be a difference between the levels of the received tones of different frequencies, should be taken into account. Thus, for example, it is possible in some cases for the levels of the received tones to vary over a range of 24 decibels, and for two adjacent tones to differ in level by 8 decibels.

For the purposes of illustration, the relay 5 has been shown with a single pair of make contacts 6. It will be understood that the relay may be provided with any desired contact system adapted to perform some required operation when the relay is operated (or released) in response to the receipt of the corresponding tone.

Circuit details of one form of the filter 3 and tone receiver 4 are shown in FIG. 2, in which the filter 3 comprises two tuned transformers 15 and 16 separated by an optional amplifier 17, which is preferably a transistor amplifier. The primary winding of the transformer 15 is series tuned to 900 cycles per second by a capacitor 18. The input terminals 19 and 20 are connected to the output of the amplifier 2 in FIG. 1. The primary winding of the transformer 16 is parallel tuned to 900 cycles per second by a capacitor 21. Transformer 16 has two secondary windings 22, 23. Winding 22 is connected to a rectifier circuit comprising the rectifier 24, a capacitor 25 and a resistor 26. The lower terminal of capacitor 25 is connected through a resistor 27 to ground, and the upper terminal is connected to the base electrode of a transistor 28. The collector electrode of the transistor 28 is connected through the winding of the relay 5 to the negative terminal of a direct-current source 29, the positive terminal of which is connected to ground. Two resistors 30 and 31 are connected in series across the source 29, and the emitter electrode of the transistor 28 is connected to the junction point of the two resistors. The potential drop across the resistor 31 provides a negative bias for the emitter electrode by which the transistor is cut off or blocked.

The secondary winding 23 of the transformer 16 is connected to a second rectifier circuit comprising the rectifier 32 and the capacitor 33. The lower terminal of the capacitor 33 is connected to ground. The upper terminal of the capacitor 33 is connected to a terminal 34 which in turn is connected through the two rectifiers 11 and 12 to the tone receivers 9 and 10, respectively (FIG. 1).

A terminal 35 is connected to the junction point of resistors 26 and 27, and also to the tone receivers 9 and 10 (FIG. 1) through the respective rectifiers 13 and 14.

The circuit of FIG. 2 operates in the following way. When a tone of frequency 900 cycles per second is applied to terminals 19 and 20, it will be rectified by the rectifier 24, which is so directed that a negative potential is stored in the capacitor 25 and is applied to the base electrode of the transistor 28. This negative potential should exceed the potential across the resistor 31, thereby unblocking the transistor. The collector current then flows through the relay 5 and operates it.

The rectifier 23 is oppositely directed to the rectifier 24 so that in response to the 900 cycle tone there is stored in the capacitor 33 a positive bias potential which is applied to both the tone receivers 9 and 10 through the rectifiers 11 and 12. These tone receivers have a circuit which is identical with that shown in FIG. 2, and the positive bias potential just mentioned is applied to the point 35 in each of those tone receivers. This bias potential acts across the resistor 27, and increases the negative bias of the emitter electrode of the transistor with respect to the base electrode, so that it requires a larger rectified potential from the rectifier 24 to unblock the transistor; in other words the sensitivity of the tone receiver has been reduced.

It will be understood that in the case of the tone receiver 4, if a 700 or 1100 cycle tone is present, the desensitising potential will be applied to terminal 35 through rectifier 13 or 14 (FIG. 2), from the tone receiver 10 or 9 (FIG. 1).

If V1 is the bais across the resistor 31, and V2 is the desensitising bias voltage across the resistor 27, it will be seen that when a 700 cycle tone is being received from the filter 8 (FIG. 1) the voltage at 900 cycles per second necessary to operate the relay 5 in the tone receiver 4 is increased in the ratio $(V1+V2)/V1$, or in other words, the sensitivity of the tone receiver is reduced by D decibels, where $D=20\log_{10}[(V_1+V_2)/V_1]$.

It follows from this, that if A decibels is the attenuation of the filter 3 at 700 cycles per second which would be necessary to prevent false operation of the relay 5 when the 700 cycle tone is present at the output of the amplifier 2 at maximum level, in the absence of the densitising potential, then when the desensitising potential is present, the filter 3 can have the smaller attenuation $A-D$ decibels at 700 cycles per second in order to avoid false operation of the relay 5, and accordingly the design of the filter 3 can be cheapened.

It should, however, be pointed out that the maximum value of D which can be used depends also on the maximum difference of level between tones of adjacent frequencies which can occur. Thus when a tone is received at the minimum level, the reduction in sensitivity of the corresponding tone receiver caused by an adjacent tone at a higher level must not be so great as to prevent the tone receiver from being operated by the minimum level tone.

While the principles of the invention have been described above in connection with specific embodiments, and particular modifications thereof, it is to be clearly understood that this description is made only by way of example and not as a limitation on the scope of the invention.

What we claim is:

1. A voice frequency signal receiver for receiving data signals each represented by two or more different tones selected from a plurality of tones of different audio frequencies arranged in order in a series, comprising a plurality of tone-receiving circuits corresponding respectively to the said plurality of tones, each of said tone-receiving circuits including a filter adapted to select a tone of the corresponding frequency and an associated tone receiver adapted to respond to the said selected tones, coupling means interconnecting each said tone receiver with the tone receiver corresponding to next higher frequency in the said series of frequencies and with the tone receiver corresponding to the next lower frequency in said series of frequencies, means in each tone receiver responsive to the receipt of an associated frequency for generating and for transmitting control signals over the associated coupling means, and means in each tone receiver receiving the said control signals for reducing the sensitivity of the last-said tone receiver without disabling it from receiving its corresponding frequency.

2. A signal receiver as set forth in claim 1 wherein the said means for generating control signals includes means for rectifying the tone of the given frequency to produce a bias potential for transmission over said coupling means.

3. A signal receiver according to claim 2 in which each tone receiver comprises gate means normally blocked by a predetermined bias level, means operable responsive to the receipt of the associated frequency for overcoming said predetermined bias and operating said gate means, and means for applying the said received bias potential to said gate means to increase the said predetermined bias level.

References Cited in the file of this patent

UNITED STATES PATENTS

| | | |
|---|---|---|
| 2,332,912 | Hecht et al. | Oct. 26, 1943 |
| 2,542,592 | Styren | Feb. 20, 1951 |
| 2,658,112 | Davison et al. | Nov. 3, 1953 |
| 2,806,903 | Hargreaves et al. | Sept. 17, 1957 |